US009007672B2

(12) United States Patent
Han et al.

(10) Patent No.: US 9,007,672 B2
(45) Date of Patent: Apr. 14, 2015

(54) TRANSMITTER OPTICAL MODULE (75) Inventors: Young-Tak Han, Daejeon (KR); Oh Kee Kwon, Daejeon (KR); Jang Uk Shin, Daejeon (KR); Sang Ho Park, Daejeon (KR); Yongsoon Baek, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 293 days.

(21) Appl. No.: 13/532,167

(22) Filed: Jun. 25, 2012

(65) Prior Publication Data

US 2013/0128331 A1    May 23, 2013

(30) Foreign Application Priority Data

Nov. 22, 2011    (KR) .................. 10-2011-0122096

(51) Int. Cl.
*G02F 1/01*    (2006.01)
*G02F 1/015*    (2006.01)

(52) U.S. Cl.
CPC ...... *G02F 1/0102* (2013.01); *G02F 2001/0155* (2013.01)

(58) Field of Classification Search
CPC .............. G02F 1/03; G02F 2001/0155; G02F 2001/0157
USPC ................................. 359/248, 254
See application file for complete search history.

(56) References Cited

U.S. PATENT DOCUMENTS 6,057,954 A * 5/2000 Parayanthal et al. ......... 359/248

OTHER PUBLICATIONS

Yi Luo et al., "High-Speed AlGaInAs-MQW Integrated EA Modulator/DFB Laser Module Based on Identical Epitaxial Layer Scheme for 40 Gb/s Optic Fiber Communication Systems", International Conference on Indium Phosphide and Related Materials, May 14-18, 2007, pp. 369-371.
T. Fujisawa, S. Kanazawa, N. Nunoya, H. Ishii, Y. Kawaguchi, A. Ohki, N. Fujiwara, K. Takahata, R. Iga, F. Kano, and H. Oohashi; "4×25-GBIT/S, 1.3—M, Monolithically Integrated Light Source for 100-GBIT/S Ethernet"; ECOC 2010, TH.9.D.1; Sep. 2010; Torino, Italy; 19-23.

* cited by examiner

*Primary Examiner* — Joseph P Martinez
(74) *Attorney, Agent, or Firm* — Rabin & Berdo, P.C.

(57) ABSTRACT

Disclosed is a transmitter optical module which includes an electro-absorption modulated laser modulating a light into an optical signal through a high-frequency electrical signal; a first sub-mount transferring the high-frequency signal to the electro-absorption modulated laser; and a second sub-mount receiving the high-frequency signal from the electro-absorption modulated laser to terminate the electro-absorption modulated laser. A length of a first wire connecting the first sub-mount and the electro-absorption modulated laser is different from a length of a second wire connecting the second sub-mount and the electro-absorption modulated laser.

18 Claims, 6 Drawing Sheets

TRANSMITTER OPTICAL MODULE

CROSS-REFERENCE TO RELATED APPLICATIONS

A claim for priority under 35 U.S.C. §119 is made to Korean Patent Application No. 10-2011-0122096 filed Nov. 22, 2011, in the Korean Intellectual Property Office, the entire contents of which are hereby incorporated by reference.

BACKGROUND

The inventive concepts described herein relate to a transmitter optical module, and more particularly, relate to a transmitter optical module using an electro-absorption modulated laser (EML).

In recent years, an optical transmission technology may have been used to provide a service to subscribers from a base station of a telephone company. A transmitter optical module may provide an optical signal used for optical transmission. The transmitter optical module may need high-speed signal modulation to transmit much informations. The transmitter optical module may use an electro-absorption modulated laser (EML) to satisfy such need.

A continuous wave (CW) emitted from a light source of the electro-absorption modulated laser may be modulated through a high-frequency electric field transferred through a transmission line. That is, a high-frequency modulation bandwidth of the optical signal must be extended to improve the data rate of the transmitter optical module.

SUMMARY

Example embodiments of the inventive concept provide a transmitter optical module which comprises an electro-absorption modulated laser modulating a light into an optical signal through a high-frequency electric field; a first sub-mount transferring the high-frequency electric field to the electro-absorption modulated laser; and a second sub-mount receiving the high-frequency electric field from the electro-absorption modulated laser to terminate the electro-absorption modulated laser. A length of a first gold-wire connecting the first sub-mount and the electro-absorption modulated laser is different from a length of a second gold-wire connecting the second sub-mount and the electro-absorption modulated laser. Hereinafter, the wires could mean as gold-wires.

In example embodiments, the length of the second wire is longer than that of the first wire.

In example embodiments, the length of the second wire is limited to a predetermined length based on a resonant property generated by the electro-absorption modulated laser and the second wire.

In example embodiments, the resonant property is determined by a magnitude of an electro-optic response of the electro-absorption modulated laser.

In example embodiments, the resonant property is determined by an overshoot level of an electro-optic response of the electro-absorption modulated laser.

Example embodiments of the inventive concept also provide a transmitter optical module comprising an electro-absorption modulated laser generating a light and modulating the light into an optical signal through a high-frequency electric field; a first sub-mount transferring the high-frequency electric field to the electro-absorption modulated laser; and a second sub-mount terminating the high-frequency electric field received from the electro-absorption modulated laser. The first sub-mount includes a first high-frequency transmission line transferring the high-frequency electric field to the electro-absorption modulated laser; and a first wire connecting the first high-frequency transmission line and the electro-absorption modulated laser. The second sub-mount includes a second high-frequency transmission line terminating the high-frequency electric field from the electro-absorption modulated laser; a matching resistor attached on the second high-frequency transmission line to terminate the electro-absorption modulated laser; and a second wire connecting the electro-absorption modulated laser and the matching resistor.

In example embodiments, the electro-absorption modulated laser comprises a light source generating a light; and an electro-absorption modulator modulating the light input from the light source into the optical signal through the high-frequency electric field. The electro-absorption modulator (EAM) includes an EAM modulation electrode connected with the light source and modulating the light input from the light source into the optical signal through the high-frequency electric field; and an EAM wire bonding pad connected with the first and second sub-mounts and inputting and outputting the high-frequency electric field.

In example embodiments, the electro-absorption modulated laser comprises a light source generating a light; and an electro-absorption modulator modulating the light input from the light source into the optical signal through the high-frequency electric field, wherein the electro-absorption modulator (EAM) includes EAM modulation electrodes connected with the light source and modulating the light input from the light source into the optical signal through the high-frequency electric field; and an EAM input electrode connected with the first sub-mount and receiving the high-frequency electric field; and an EAM output electrode connected with the second sub-mount and outputting the high-frequency electric field.

In example embodiments, the first and second sub-mounts are formed of a flexible printed circuit board, respectively.

In example embodiments, the first high-frequency transmission line is a grounded coplanar waveguide transmission line formed on the first sub-mount, and the second high-frequency transmission line is also a grounded coplanar waveguide transmission line formed on the second sub-mount.

In example embodiments, the matching resistor is a surface mountable device (SMD)-type matching resistor.

In example embodiments, the matching resistor is attached to the second high-frequency transmission line through a die-bonding using solder paste or silver epoxy.

In example embodiments, the length of the second wire is longer than that of the first wire.

In example embodiments, the length of the second wire is limited to a predetermined length based on a resonant property generated by the electro-absorption modulated laser and the second wire.

In example embodiments, the resonant property is determined by a magnitude of an electro-optic response of the electro-absorption modulated laser.

In example embodiments, the resonant property is determined by an overshoot level of an electro-optic response of the electro-absorption modulated laser.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Embodiments will be described in detail with reference to the accompanying drawings. The inventive concept, however, may be embodied in various different forms and should not be construed as being limited only to the illustrated embodiments. Rather, these embodiments are provided as examples so that this disclosure will be thorough and complete and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
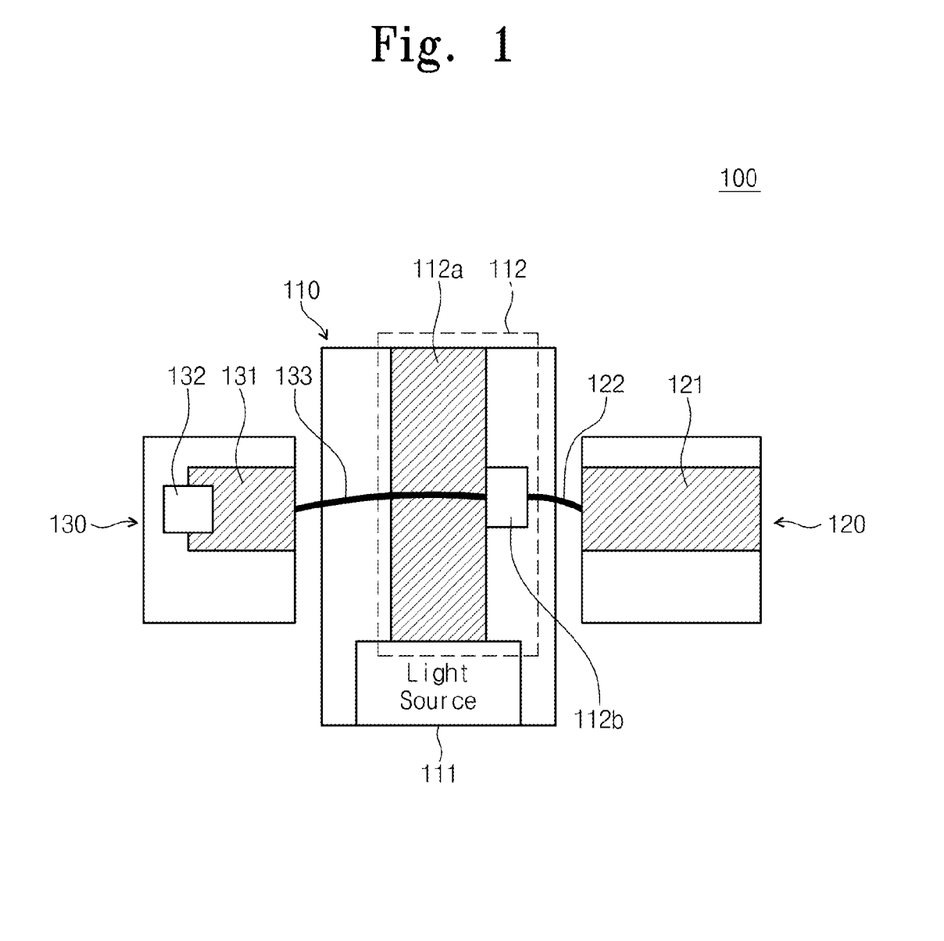
FIG. 1 is a conceptual diagram illustrating a transmitter optical module according to an embodiment of the inventive concept.

FIG. 1 is a conceptual diagram illustrating a transmitter optical module according to an embodiment of the inventive concept. Referring to FIG. 1, a transmitter optical module 100 may include an electro-absorption modulated laser (hereinafter, referred to as EML) 110, a first sub-mount 120, and a second sub-mount 130.

The EML 110 may generate light. The EML 110 may modulate the light into an optical signal through a high frequency electric field. The EML 110 may include a light source 111 and an electro-absorption modulator (hereinafter, referred to as EAM) 112.

The light source 111 may generate light. The light generated from the light source 111 may be a continuous wave. Alternatively, the light generated from the light source 111 may be an optical pulse train. The light source 111 may be formed of a distributed feedback laser diode (DFB-LD).

The EAM 112 may modulate the light from the light source 111 into an optical signal using a high-frequency electric field. The EAM 112 may include an EAM modulation electrode 112a and a wire bonding pad 112b.

The EAM 112 may be connected with the light source 111. At the EAM modulation electrode 112a, the light outputted from the light source 111 may be modulated into a high-frequency optical signal through a high-frequency electric field applied from the wire bonding pad 112b.

The EAM may be formed of a material including a bulk, a multiple quantum well, or a super lattice. The EAM may have an optical absorption coefficient that is varied according to an input bias voltage. Thus, the light penetrating the EAM modulation electrode 112a may be modulated into an optical signal the magnitude of which is varied according to a high-frequency electric field applied to the EAM modulation electrode 112a as a bias.

The wire bonding pad 112b may be connected with the EAM modulation electrode 112a. The wire bonding pad 112b may transfer a high-frequency signal applied from the first sub-mount 120 into the EAM modulation electrode 112a.

The first sub-mount 120 may provide the EML 110 with a high-frequency signal transmitted from an external electronic circuit. The first sub-mount 120 may include a first high-frequency transmission line 121.

The first high-frequency transmission line 121 may be formed on the first sub-mount 120. The first high-frequency transmission line 121 may include ground via holes for preventing a high-frequency electric field from being distorted due to radio-frequency (RF) resonance. Upper and lower grounds of the first high-frequency transmission line 121 may be electrically connected by the ground via holes. The first high-frequency transmission line 121 may be connected with the wire bonding pad 112b through a first wire 122.

The first sub-mount 120 may be a flexible printed circuit board (FPCB). At this time, the first high-frequency transmission line 121 may be a grounded coplanar waveguide (GCPW). The flexible printed circuit board may be cheaper than a ceramic sub-mount and may be easy to form the ground via holes. Thus, it is possible to reduce a fabrication cost of the sub-mount. The flexible printed circuit board may have the permittivity smaller than the ceramic sub-mount. A distance between an upper signal electrode and a lower ground of the flexible printed circuit board may be narrower than that of the ceramic sub-mount. Thus, there may be reduced signal distortion due to resonance and high-order modes at a high frequency. However, the inventive concept is not limited thereto.

The second sub-mount 130 may terminate the EAM 112 connected with the first high-frequency transmission line 121. This may enable the second sub-mount 130 to reduce return loss of a high frequency transferred to the EAM 112. The second sub-mount 130 may include a second high-frequency transmission line 131 and a matching resistor 132.

The second high-frequency transmission line 131 may be formed on the second sub-mount 130. The second high-frequency transmission line 131 may be connected with the wire bonding pad 112b through a second wire 133. The matching resistor 132 may be connected to an end of the second high-frequency transmission line 131.

The matching resistor 132 may be connected with the wire bonding pad 112b to terminate the EAM 112 to a specific value. In example embodiments, the matching resistor 132 may have a resistance value of about 50 ohms. However, the inventive concept is not limited thereto.

The second sub-mount 130 may be a flexible printed circuit board (FPCB). At this time, the second high-frequency transmission line 131 may be a grounded coplanar waveguide (GCPW). The matching resistor 131 may be a surface mountable device (SMD)-type matching resistor. The matching resistor 131 may be attached on the second high-frequency transmission line 131 by solder paste or silver epoxy. A process cost of the SMD matching resistor may be cheaper than that of a thin-film matching resistor formed on a ceramic sub-mount. Thus, it is possible to reduce a fabrication cost of a sub-mount. However, the inventive concept is not limited thereto.

The transmitter optical module 100 may have a lumped electrode structure which is configured such that the EAM 112 receives a high-frequency signal through the wire bonding pad 112b. The lumped electrode structure may be a structure that a high frequency signal is applied to a center of the EAM modulation electrode. In a general lumped electrode structure, the EAM modulation electrode may be connected with a high-frequency transmission line 121 using one wire. With the transmitter optical module, it is possible to increase a high-frequency modulation bandwidth by using two wires and adjusting a length of each wire.

Impedance mismatch may mainly arise due to inductance of the first wire 122 which connects the wire bonding pad 112b and the first high-frequency transmission line 121. Due to the impedance mismatch, a high-frequency signal transferred to the EAM 112 from the first high-frequency transmission line 131 may be reflected back to the first high-frequency transmission line 131. The shorter a length of the first wire 122, the less impedance mismatch. For example, the first wire 122 may have a length of about 150 μm to 300 μm. The shorter a length of the first wire 122 becomes, the higher the transfer efficiency of a high-frequency signal to the EAM 112 becomes. Thus, as a length of the first wire 122 becomes shorter, it is possible to prevent a voltage from being dropped at a high-frequency band. Thus, a high-frequency modulation bandwidth may increase.

On the other hand, the second wire 133 can be configured to have a longer length than the first wire 122. Radio-frequency (RF) resonance may be generated due to capacitance of the EAM 112 and inductance of the second wire 133. Due to the resonance, a high-frequency signal transferred to the second high-frequency transmission line 131 from the EAM 112 may be reflected to be transferred back to the EAM 112. Thus, as a length of the second wire 133 becomes longer, it is possible to prevent a voltage from being dropped at a high-frequency band. Thus, a high-frequency modulation bandwidth may increase.

A length of the second wire 133 may be limited within a predetermined length according to a resonance property. In example embodiments, the length of the second wire 133 may be limited such that a return loss value of a high-frequency signal maintains a predetermined allowable range of an optical transmitter. For example, a return loss value of a high-frequency signal may be limited to maintain less than −8 dB at an operating frequency.

Also, the length of the second wire 133 may be limited such that an electro-optic response is overshoot within a predetermined allowable range due to the resonance. For example, the length of the second wire 133 may be limited such that the overshooting of an electro-optic response of the EML becomes less than 2 dB. However, the inventive concept is not limited thereto.

With the transmitter optical module of the inventive concept, a high-frequency bandwidth may increase by reducing a length of the first wire 122 and increasing a length of the second wire 133 to correspond to the resonance. In example embodiments, the transmitter optical module of the inventive concept is described using the EAM having a lumped electrode structure. However, the inventive concept is not limited thereto. Below, a transmitter optical module having a traveling-wave structure will be more fully described with reference to accompanying drawings. Unlike the lumped electrode structure that a high-frequency signal is applied to a center of the EAM modulation electrode, the traveling-wave structure may be a structure that a high-frequency signal is traveled along the whole transmission line of an EAM modulation electrode.

Figure 2:
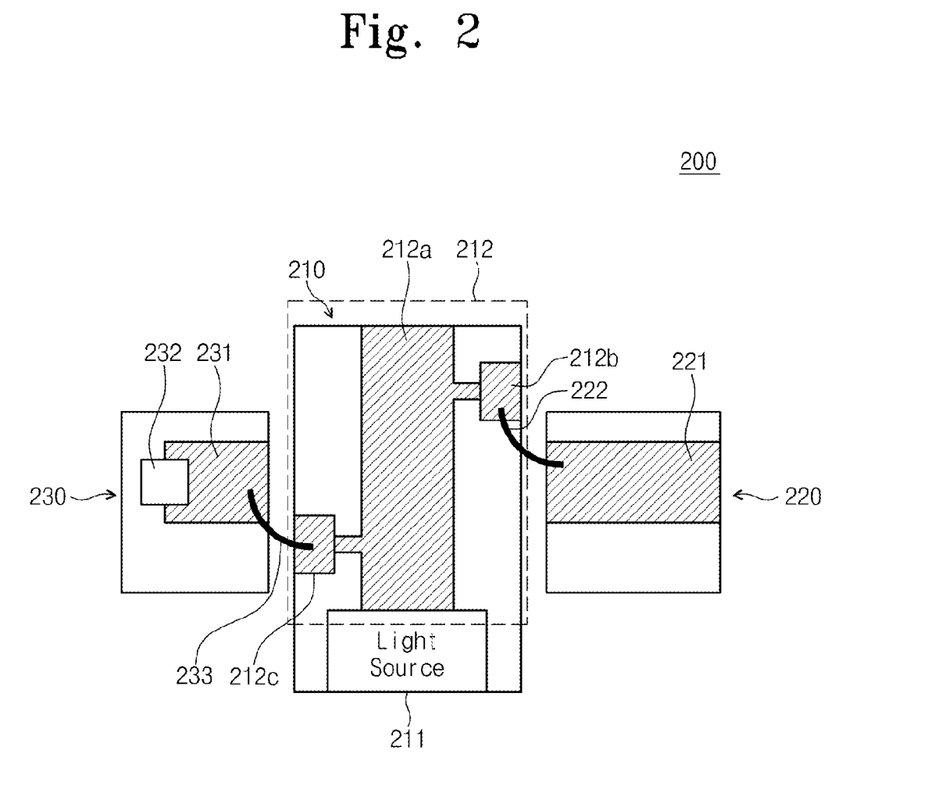
FIG. 2 is a conceptual diagram illustrating a transmitter optical module according to another embodiment of the inventive concept.

FIG. 2 is a conceptual diagram illustrating a transmitter optical module according to another embodiment of the inventive concept. Referring to FIG. 2, a transmitter optical module 200 may include an electro-absorption modulated laser (hereinafter, referred to as EML) 210, a first sub-mount 220, and a second sub-mount 230. The EML 210 may include a light source 211 and an electro-absorption modulator (hereinafter, referred to as EAM) 212. The transmitter optical module 200 in FIG. 2 may be substantially the same as that in FIG. 1 except for an EAM structure.

The EAM 212 may include an EAM modulation electrode 212a, an EAM input electrode 212b, and an EAM output electrode 212c. The EAM 212 may be connected with the light source 211.

The light incident from the light source 211 may be modulated into a high-frequency optical signal through a high-frequency electric field applied from the EAM input electrode 212b as the light permeates under the EAM modulation electrode 212a.

The EAM input electrode 212b may be connected with the EAM modulation electrode 212a. The EAM input electrode 212b may be connected with a first high-frequency transmission line 221 via a first wire 222. The EAM input electrode 212b may receive a high-frequency signal from the first high-frequency transmission line 221. The EAM input electrode 212b may provide the input high-frequency signal to the EAM modulation electrode 212a.

The EAM output electrode 212c may be connected to the EAM modulation electrode 212a. The EAM output electrode 212c may be connected with a second high-frequency transmission line 231 of a second sub-mount 230 through a second wire 233. The EAM output electrode 212c may transfer a high-frequency signal output from the EAM input electrode 212b into the second high-frequency transmission line 231.

Each of first and second sub-mounts 220 and 230 may be a flexible printed circuit board (FPCB). At this time, each of the first and second high-frequency transmission lines 221 and 231 may be a grounded coplanar waveguide (GCPW). A matching resistor 232 may be a surface mountable device (SMD)-type matching resistor. The matching resistor 232 may be attached on the second high-frequency transmission line 231 by solder paste or silver epoxy. The flexible printed circuit board may be cheaper than a ceramic sub-mount, and may be easy to form ground via holes. A process cost of the SMD matching resistor may be cheaper than that of a thin-film matching resistor formed on a ceramic sub-mount. Thus, it is possible to reduce a fabrication cost of a sub-mount. The flexible printed circuit board may have the permittivity smaller than the ceramic sub-mount. A distance between an upper signal electrode and a lower ground of the flexible printed circuit board may be narrower than that of the ceramic sub-mount. Thus, there may be reduced signal distortion due to resonance and high-order modes at a high frequency. However, the inventive concept is not limited thereto.

The transmitter optical module 200 of the inventive concept may be configured to have a traveling-wave electrode structure that one electrode receiving a high-frequency electric field from the first high-frequency transmission line 221 is different from the other electrode outputting a high-frequency electric field to the second high-frequency transmission line 231. With the traveling-wave electrode structure, a high-frequency signal may pass through the whole EAM modulation electrode.

Like the lumped electrode structure, impedance mismatch may mainly arise due to inductance of the first wire 122 which connects the EAM input electrode 212b and the first high-frequency transmission line 221. Due to the impedance mismatch, a high-frequency signal transferred to the EAM 212 from the first high-frequency transmission line 231 may be reflected back to the first high-frequency transmission line 231. The shorter a length of the first wire 222, the less impedance mismatch. For example, the first wire 222 may have a length of about 150 μm to 300 μm. The shorter a length of the first wire 222 becomes, the higher the transfer efficiency of a high-frequency signal to the EAM 212 becomes. Thus, as a length of the first wire 222 becomes shorter, it is possible to prevent a voltage from being dropped at a high-frequency band. Thus, a high-frequency modulation bandwidth may increase.

On the other hand, the second wire 233 can be configured to have a longer length than the first wire 222. The RF resonance may be generated due to capacitance of the EAM 212 and inductance of the second wire 233. Due to the resonance, a high-frequency signal transferred to the second high-frequency transmission line 231 from the EAM 212 may be reflected to be transferred back to the EAM 212. Thus, as a length of the second wire 233 becomes longer, it is possible to prevent a voltage from being dropped at a high-frequency band. Thus, a high-frequency modulation bandwidth may increase.

In example embodiments, a length of the second wire 233 may be limited such that a return loss value of a high-frequency signal maintains a predetermined allowable range of an optical transmitter, for example, less than −8 dB.

Also, the length of the second wire 233 may be limited such that an electro-optic response is overshoot within a predetermined allowable range due to the resonance. For example, the length of the second wire 233 may be limited such that the overshooting of an electro-optic response of the EML becomes less than 2 dB. However, the inventive concept is not limited thereto.

With the transmitter optical module of the inventive concept, thus, a high-frequency bandwidth may increase by reducing a length of the first wire 222 and increasing a length of the second wire 233 to correspond to the resonance.

Figure 3:
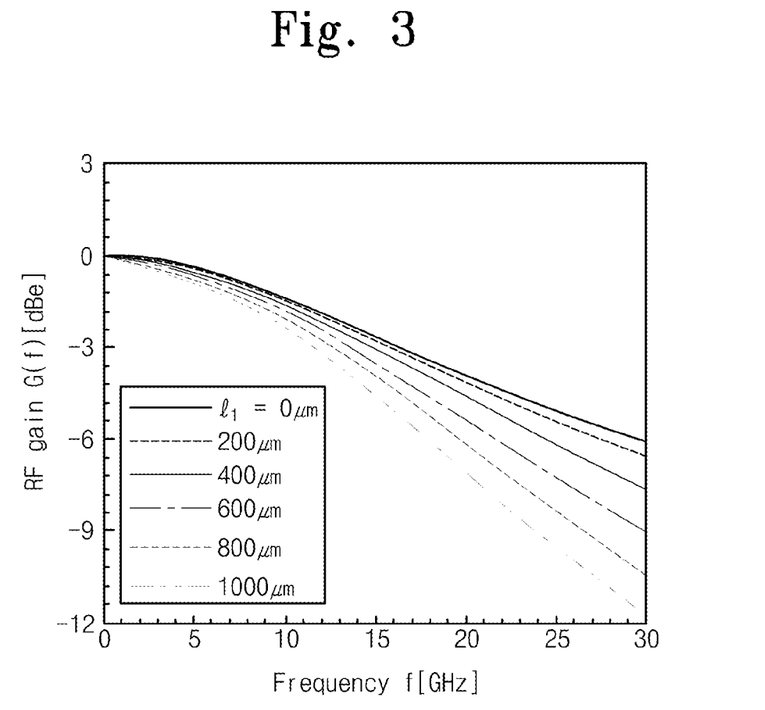
FIG. 3 is a graph illustrating a high-frequency modulation bandwidth property for various length of a first wire of a transmitter optical module.
Figure 4:
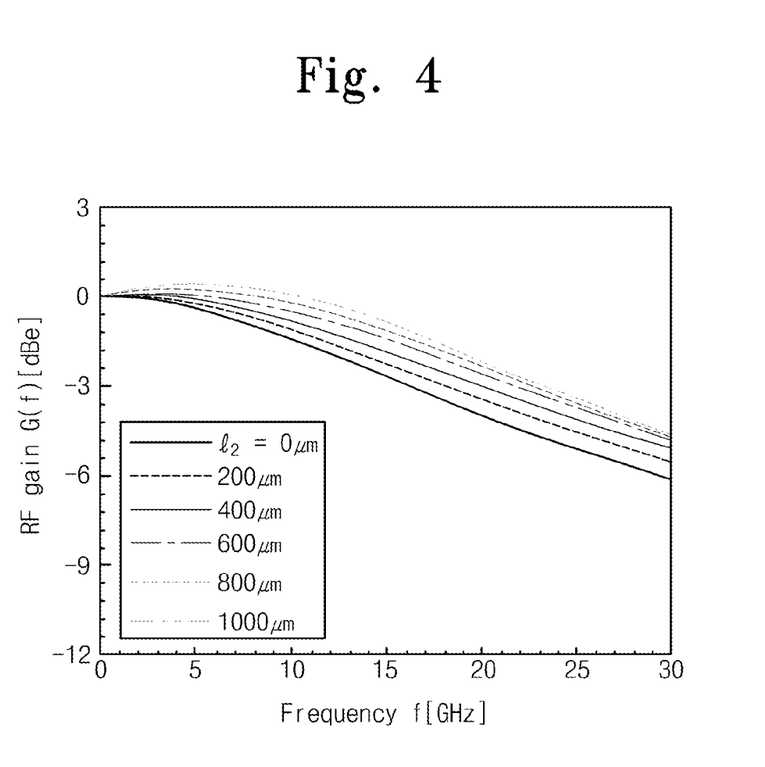
FIG. 4 is a graph illustrating a high-frequency modulation bandwidth property for various length of a second wire of a transmitter optical module.

FIG. 3 is a graph illustrating a high-frequency modulation bandwidth property as a function of a length of a first wire of a transmitter optical module. FIG. 4 is a graph illustrating a high-frequency modulation bandwidth property as a function of a length of a second wire of a transmitter optical module. Graphs in FIGS. 3 and 4 may be obtained by simulating a high-frequency equivalent circuit comprising a high-frequency transmission line, a matching resistor, a first wire, and a second wire. The graphs in FIGS. 3 and 4 may be applied to both a traveling-wave electrode structure and a lumped electrode structure. In the structures, a length of an EAM modulation electrode may be less than about 300 μm.

FIG. 3 shows a result simulated under the condition that a length of a second wire is fixed to 0 μm and a length of a first wire is varied. As understood from FIG. 3, a high-frequency modulation bandwidth may sharply decrease when a length of the first wire becomes longer.

FIG. 4 shows a result simulated under the condition that a length of the first wire is fixed to 0 μm and a length of the second wire is varied. As understood from FIG. 4, a high-frequency modulation bandwidth may increase by the RF resonance when a length of the second wire becomes longer. Thus, a high-frequency modulation bandwidth of a transmitter optical module may increase by reducing a length of the first wire and increasing a length of the second wire to correspond to the resonance.

Figure 5:
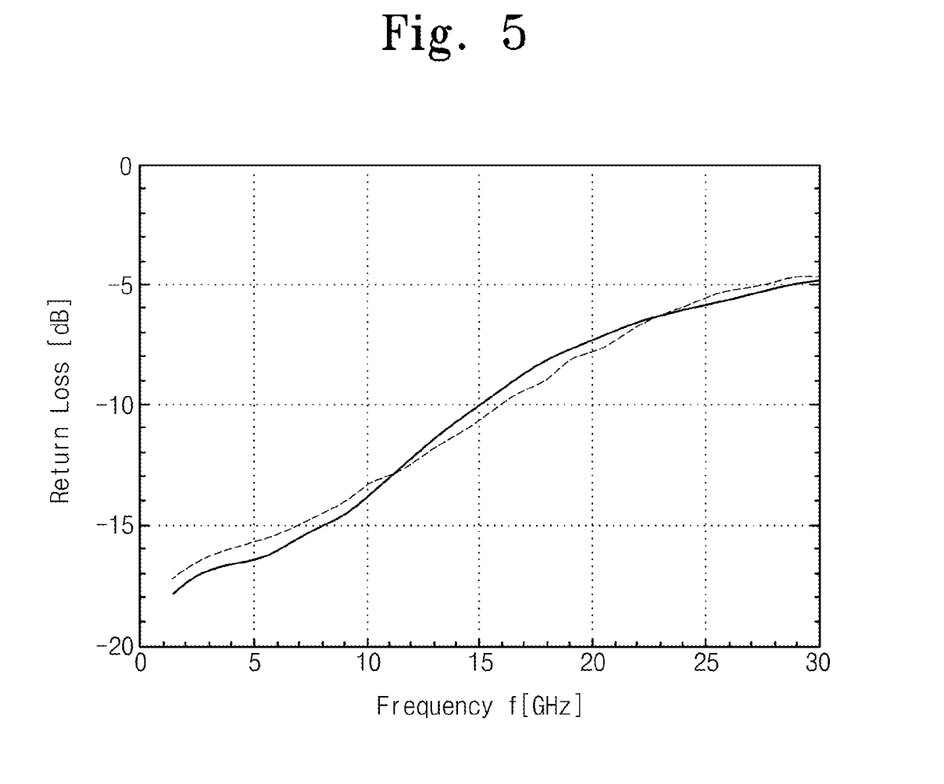
FIG. 5 is a graph illustrating return loss as a function of a frequency of a transmitter optical module according to an embodiment of the inventive concept.

FIG. 5 is a graph illustrating return loss as a function of a frequency of a transmitter optical module according to an embodiment of the inventive concept. In FIG. 5, a dotted line may indicate return loss of a transmitter optical module when lengths of first and second wires are fixed to about 300 μm. In FIG. 5, a solid line may indicate return loss of the transmitter optical module when a first wire has a length of about 300 μm and a second wire has a length of about 700 μm. Herein, the return loss may mean return loss when a high-frequency signal is sent to an EAM modulation electrode.

As understood from FIG. 5, although a length of the second wire increases, the return loss may not be varied greatly. That is, an increase in a length of the second wire may scarcely affect impedance mismatch when a high-frequency signal is transmitted to the EAM modulation electrode through the first wire.

Figure 6:
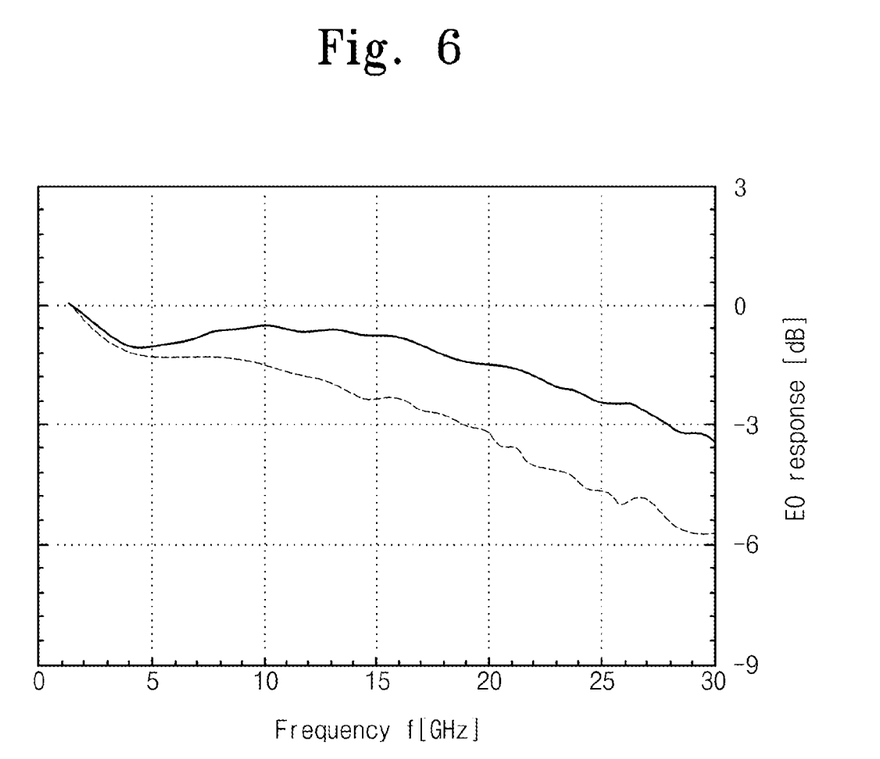
FIG. 6 is a graph illustrating an electro-optic response as a function of a frequency of a transmitter optical module according to an embodiment of the inventive concept.

FIG. 6 is a graph illustrating an electro-optic response as a function of a frequency of a transmitter optical module according to an embodiment of the inventive concept. In FIG. 6, a dotted line may indicate an electro-optic response of a transmitter optical module when lengths of first and second wires are fixed to about 300 μm. In FIG. 6, a solid line may indicate an electro-optic response of the transmitter optical module when a first wire has a length of about 300 μm and a second wire has a length of about 700 μm.

As understood from FIG. 6, a −3 dB high-frequency modulation bandwidth may increase by about 10 GHz when a length of the second wire increases. It may be understood that the overshooting due to the resonance is limited within 2 dB. As described above, excessive overshooting may be generated when a length of the second wire increases excessively. Thus, a length of the second wire may be limited within a predetermine range.

The transmitter optical module according to an embodiment of the inventive concept may easily extend a high-frequency modulation bandwidth from the termination of an EML connected with a high-frequency transmission line. A flexible printed circuit board may be used as a sub-mount. As described above, signal distortion may be reduced, and it is possible to easily form ground via holes at a low-cost compared with the case that a ceramic sub-mount is used. Also, as flexible printed circuit board is used as a sub-mount, a matching resistor may be formed of a surface mountable device (SMD) matching resistor instead of a thin-film matching resistor. Thus, it is possible to easily match impedance at a low-cost.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A transmitter optical module comprising:
an electro-absorption modulated laser modulating a light into an optical signal through a high-frequency signal;
a first sub-mount transferring the high-frequency signal to the electro-absorption modulated laser; and
a second sub-mount receiving the high-frequency signal from the electro-absorption modulated laser to terminate the electro-absorption modulated laser,
wherein a length of a first wire connecting the first sub-mount and the electro-absorption modulated laser is different from a length of a second wire connecting the second sub-mount and the electro-absorption modulated laser.

2. The transmitter optical module of claim 1, wherein the length of the second wire is longer than that of the first wire.

3. The transmitter optical module of claim 1, wherein the length of the second wire is limited to a predetermined length based on a resonant property generated by the electro-absorption modulated laser and the second wire.

4. The transmitter optical module of claim 3, wherein the resonant property is determined by a magnitude of an electro-optic response of the electro-absorption modulated laser.

5. The transmitter optical module of claim 3, wherein the resonant property is determined by an overshoot level of an electro-optic response of the electro-absorption modulated laser.

6. A transmitter optical module comprising:
an electro-absorption modulated laser generating a light and modulating the light into an optical signal through a high-frequency signal;
a first sub-mount transferring the high-frequency signal to the electro-absorption modulated laser; and
a second sub-mount receiving the high-frequency signal from the electro-absorption modulated laser,
wherein the first sub-mount includes a first high-frequency transmission line transferring the high-frequency signal to the electro-absorption modulated laser; and a first wire connecting the first high-frequency transmission line and the electro-absorption modulated laser; and
wherein the second sub-mount includes a second high-frequency transmission line receiving the high-frequency signal from the electro-absorption modulated laser; a matching resistor attached on the second high-frequency transmission line to terminate the electro-absorption modulated laser; and a second wire connecting the electro-absorption modulated laser and the matching resistor.

7. The transmitter optical module of claim 6, wherein the electro-absorption modulated laser comprises:
a light source generating a light; and
an electro-absorption modulator modulating the light input from the light source into the optical signal through the high-frequency signal,
wherein the electro-absorption modulator (EAM) includes:
an EAM modulation electrode connected with the light source and modulating the light input from the light source into the optical signal through the high-frequency signal; and
an EAM wire bonding pad connected with the first and second sub-mounts and inputting and outputting the high-frequency signal.

8. The transmitter optical module of claim 6, wherein the electro-absorption modulated laser comprises:
a light source generating a light; and
an electro-absorption modulator modulating the light input from the light source into the optical signal through the high-frequency electrical signal,
wherein the electro-absorption modulator (EAM) includes:
an EAM modulation electrode connected with the light source and modulating the light input from the light source into the optical signal through the high-frequency signal; and
an EAM input electrode connected with the first sub-mount and receiving the high-frequency signal; and
an EAM output electrode connected with the second sub-mount and outputting the high-frequency electric field.

9. The transmitter optical module of claim 6, wherein the first and second sub-mounts are formed of a flexible printed circuit board, respectively.

10. The transmitter optical module of claim 9, wherein the first high-frequency transmission line is a grounded coplanar waveguide transmission line formed on the first sub-mount, and the second high-frequency transmission line is also a grounded coplanar waveguide transmission line formed on the second sub-mount.

11. The transmitter optical module of claim 9, wherein the matching resistor is a surface mountable device (SMD)-type matching resistor.

12. The transmitter optical module of claim 9, wherein the matching resistor is attached to the second high-frequency transmission line through a die-bonding using solder paste or silver epoxy.

13. The transmitter optical module of claim 6, wherein the length of the second wire is longer than that of the first wire.

14. The transmitter optical module of claim 6, wherein the length of the second wire is limited to a predetermined length based on a resonant property generated by the electro-absorption modulated laser and the second wire.

15. The transmitter optical module of claim 6, wherein the resonant property is determined by a magnitude of an electro-optic response of the electro-absorption modulated laser.

16. The transmitter optical module of claim 6, wherein the resonant property is determined by an overshoot level of an electro-optic response of the electro-absorption modulated laser.

17. The transmitter optical module of claim 1, wherein the first sub-mount and the second sub-mount are FPCB (flexible printed circuit board).

18. The transmitter optical module of claim 6, wherein the first sub-mount and the second sub-mount are FPCB (flexible printed circuit board) and the matching resistor is a SMD (surface mountable device) matching resistor.

* * * * *